June 6, 1939.     J. VAN N. DORR     2,160,838
SEDIMENTATION
Original Filed Jan. 25, 1935     4 Sheets-Sheet 1
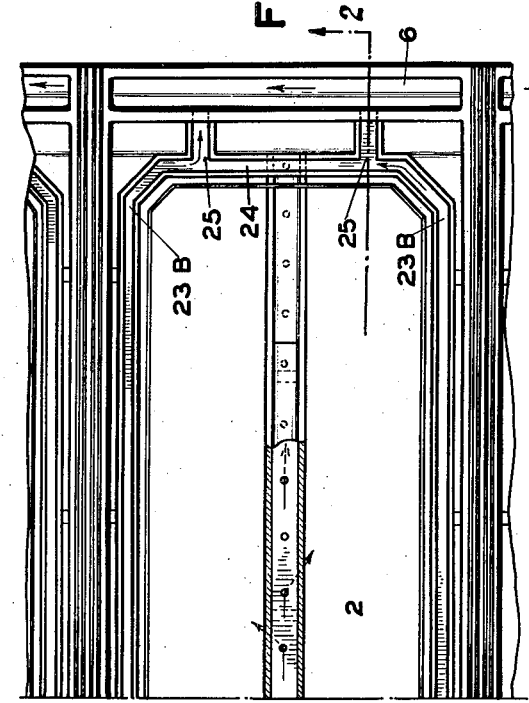
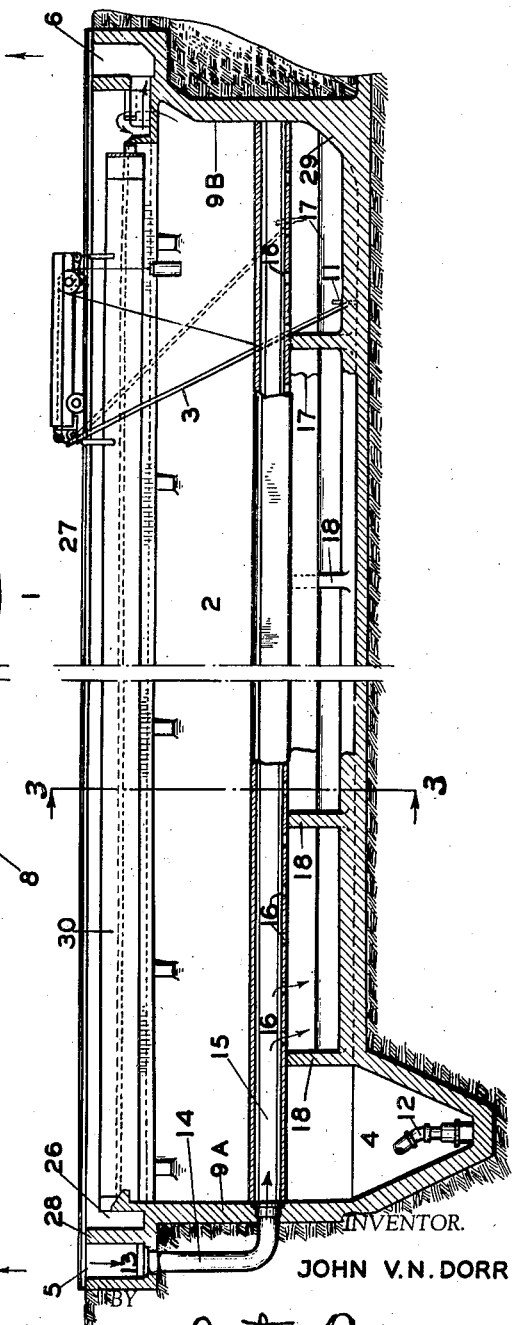
INVENTOR.
JOHN V. N. DORR
ATTORNEY.

June 6, 1939.  J. VAN N. DORR  2,160,838
SEDIMENTATION
Original Filed Jan. 25, 1935    4 Sheets-Sheet 2

INVENTOR.
JOHN V. N. DORR
BY Arthur Middleton
ATTORNEY.

June 6, 1939.    J. VAN N. DORR    2,160,838
SEDIMENTATION
Original Filed Jan. 25, 1935    4 Sheets-Sheet 3
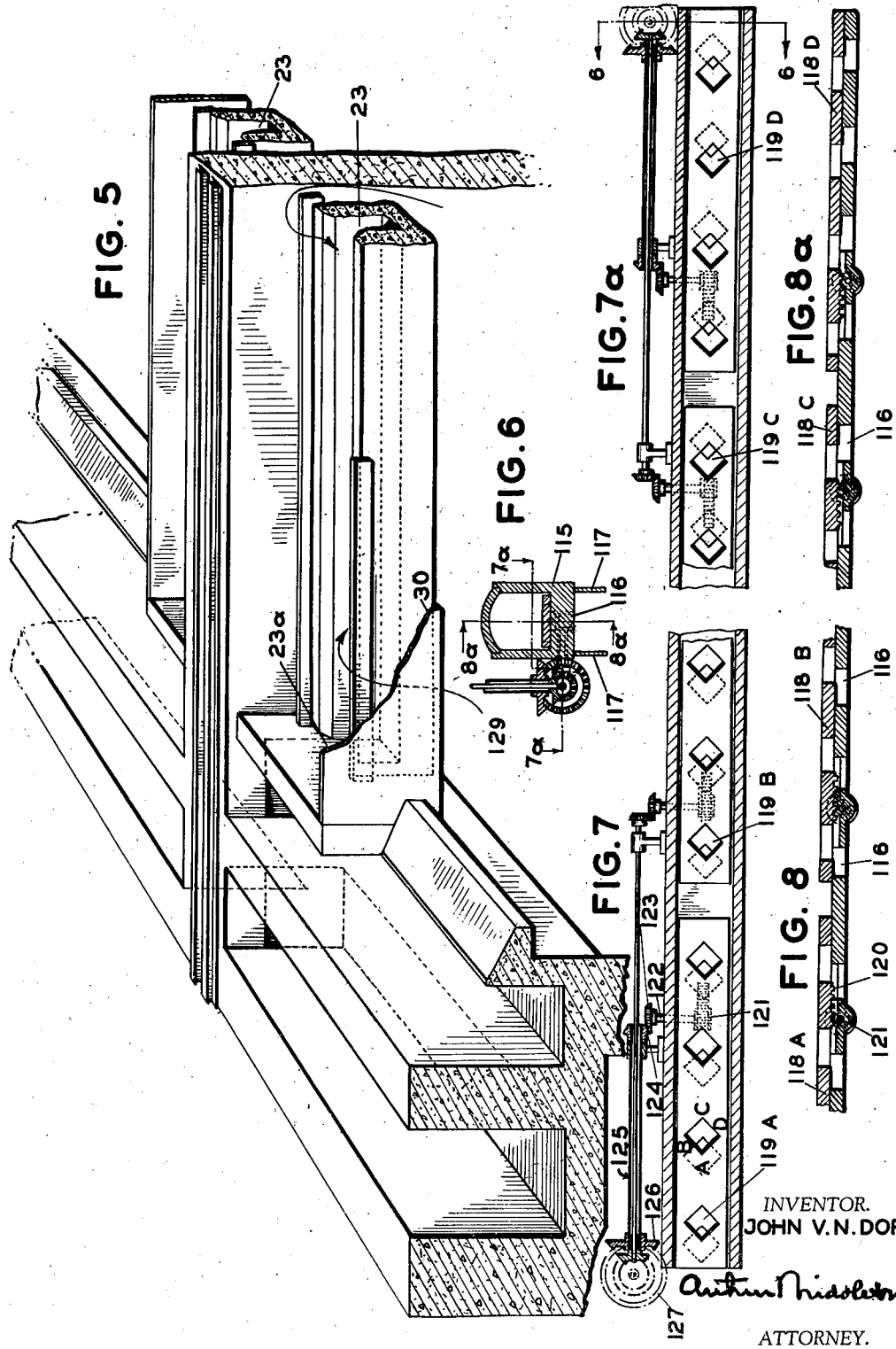
INVENTOR.
JOHN V. N. DORR
ATTORNEY.

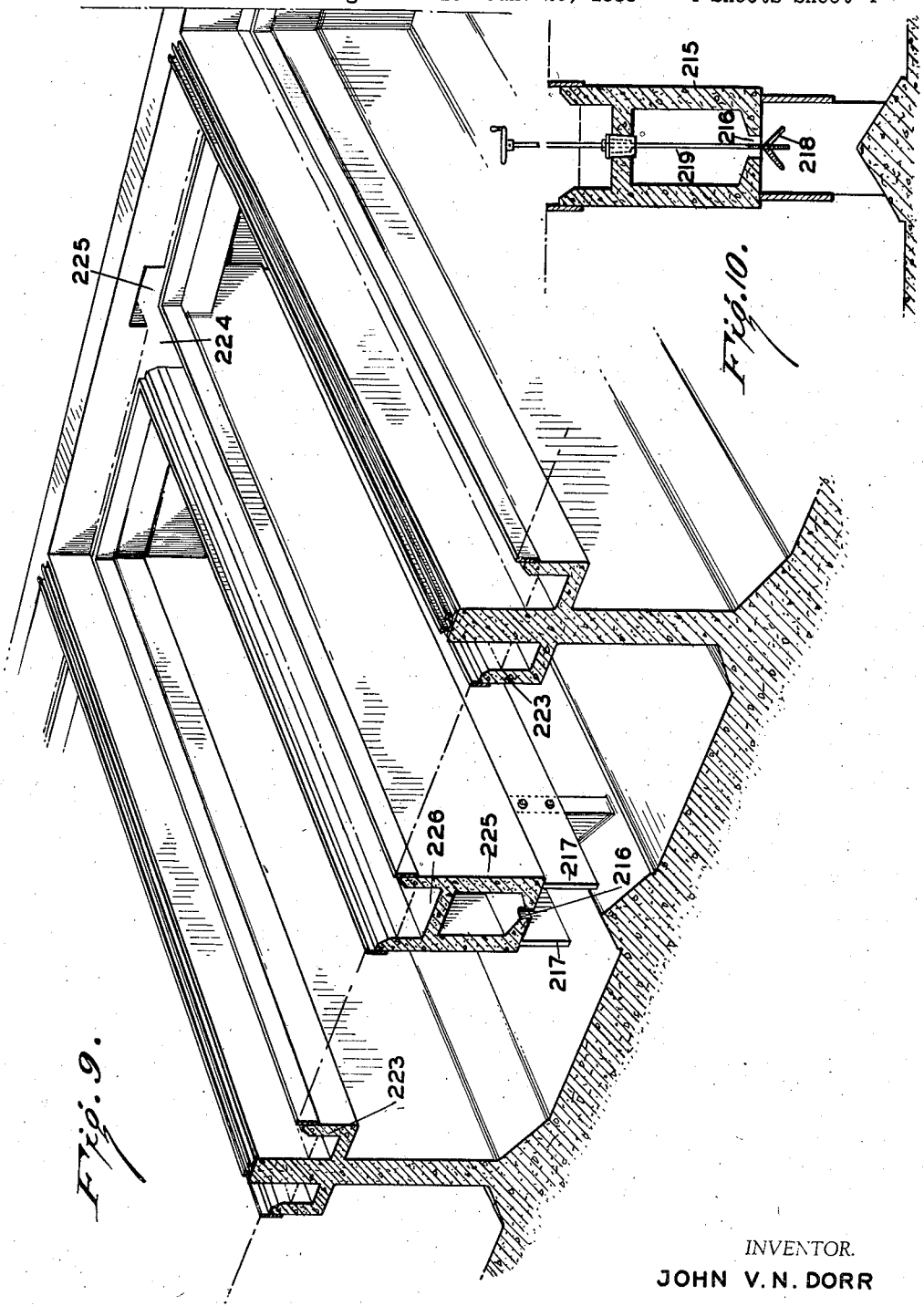

Patented June 6, 1939

2,160,838

UNITED STATES PATENT OFFICE 2,160,838

SEDIMENTATION

John van Nostrand Dorr, Westport, Conn., assignor to The Dorr Company, Inc., New York, N. Y., a corporation of Delaware Application January 25, 1935, Serial No. 3,381
Renewed September 9, 1938

8 Claims. (Cl. 210—55)

The invention relates to the removal of suspended solids from liquid for the purpose of effecting a complete or partial clarification, as the case may be, of the liquid. The invention particularly relates to apparatus useful in this connection.

There are many fields where there is a relatively large amount of liquid carrying suspended matter which it is desirable to clarify to a greater or less extent so as to remove by a sedimentation process certain of the suspended matter therein. Some of the fields of use which may be mentioned—in an illustrative but not in a restrictive sense—are or involve the thickening or settling of ore concentrates, the treating of paper pulp to effect the recovery of thickened pulp, the treating of industrial water to recover or remove certain suspended matter therein or therefrom prior to delivery of the industrial water as to streams or other places of disposition, the treating of sewage or sewage sludge in order to deliver a clear or clearer effluent and to recover or obtain certain solid content thereof as sedimented sludge. Manifestly many other fields of use might be mentioned.

The invention of the present case may be considered as relating to a thickener or clarifier for general use and it revolves about a construction wherein there is a sedimentation tank or basin into which there is a delivery of the liquid to be clarified by a longitudinally extending influent supply conduit. The conduit is closed and submerged and carries the influent therein isolated from the surrounding liquid in the tank and under a hydrostatic head which corresponds to the depth of its submergence. The liquid to be clarified flows from along the bottom of the conduit through a series of submerged influent delivery sections longitudinally arranged along a lower interior section of the tank. The influent is thus delivered directly into a lower longitudinally extending section, or sections, of the settling chamber of the thickener or clarifier and is compelled to take a U-shaped path or U-shaped paths extending in a general transverse direction. During this U-shaped transverse flow there follows a substantial settling out of the suspended matter. The clarified liquid in passing from the settling chamber continues the general transverse flow or flows to and into one or more longitudinally extending effluent launders disposed along an upper interior section of the settling chamber. The clarifier or thickener is provided with a longitudinally movable raking mechanism by which the settled sludge is longitudinally moved along the floor of the tank to a depressed section of the latter from which the sludge is withdrawn as by a pumping mechanism or other sludge removing arrangement. The clarifier may or may not be provided with a scum removing mechanism according to the desires of a particular operator or the requirements for a particular plant.

According to one aspect of the invention the clarifier or clarifying apparatus comprises a settling tank or chamber which is long as compared with its breadth and depth, which in plan is approximately rectangular, which has an approximately flat horizontal bottom, and which also has upright sides and ends. This form of clarifier preferably has an influent supply means that comprises delivery sections provided by a submerged pipe or conduit located in and along a lower section thereof and from which—through slots, passageways or openings provided in or along the same—there is a downward discharge of liquid to be clarified. In one form of clarifier this submerged influent supply pipe or conduit is disposed along the lower portion of a longitudinally extending central section of the settling chamber or tank, and said tank also has arranged adjacent or along the upper portions of the longitudinally extending sides thereof effluent launders which function to influence or cause divided transverse flows of the liquid delivered from the discharge slots or passageways of the influent supply means whereby during the divided transverse flows there follows a substantial settling in the form of sludge of solids suspended within the liquid.

In a clarifier embodying these features of construction there can be realized a relatively uniform distribution or delivery of liquid to be treated throughout the length of the tank. Also regardless of the particular length of the tank there can be realized a transverse flow of the same general character throughout each transverse section of the tank with the result that a relatively uniform settling condition for the liquid being treated follows for each and all said sections of the tank.

The invention according to its more specific aspects relates to the arrangement of the several different parts and features which enter into the clarifier construction as a whole and to the functioning thereof. Further objects and features will become apparent from the succeeding portions of the specification including the claims thereof.

The invention possesses other objects and features of advantages, some of which, with the foregoing, will be set forth in the following description. In the description and in the claims, parts will be identified by specific names for convenience but they are intended to be as generic in their application to similar parts as the art will permit. In the accompanying drawings there has been illustrated the best embodiment of this invention known to me but such embodiment is to be regarded as typical only of many possible embodiments and the invention is not to be limited thereto.

As illustrating certain specific manners in which the invention may be realized reference is made to the accompanying drawings forming a part of this specification and in which drawings:

Fig. 1 shows in plan a clarifier having a long settling tank or sedimentation basin of the rectangular type and its arrangement in a system employing a plurality of such tanks or basins.

Fig. 2 is a vertical longitudinal sectional view of a clarifier and is a view taken on the vertical planes indicated by the broken line 2—2 of Fig. 1 looking in the direction of the arrows.

Fig. 3 is on a larger scale than that of Fig. 1 or Fig. 2.

Fig. 5 is a perspective view of an end section of the clarifier of Fig. 1. In this Fig. 5 the relative position of the main influent conduit in respect to certain effluent launders is clearly brought out as is also the position of a scum launder that provides an outflow for scum passed thereinto.

Fig. 6 is a cross sectional view of a modified form of influent supply conduit which may be employed.

Figure 3:
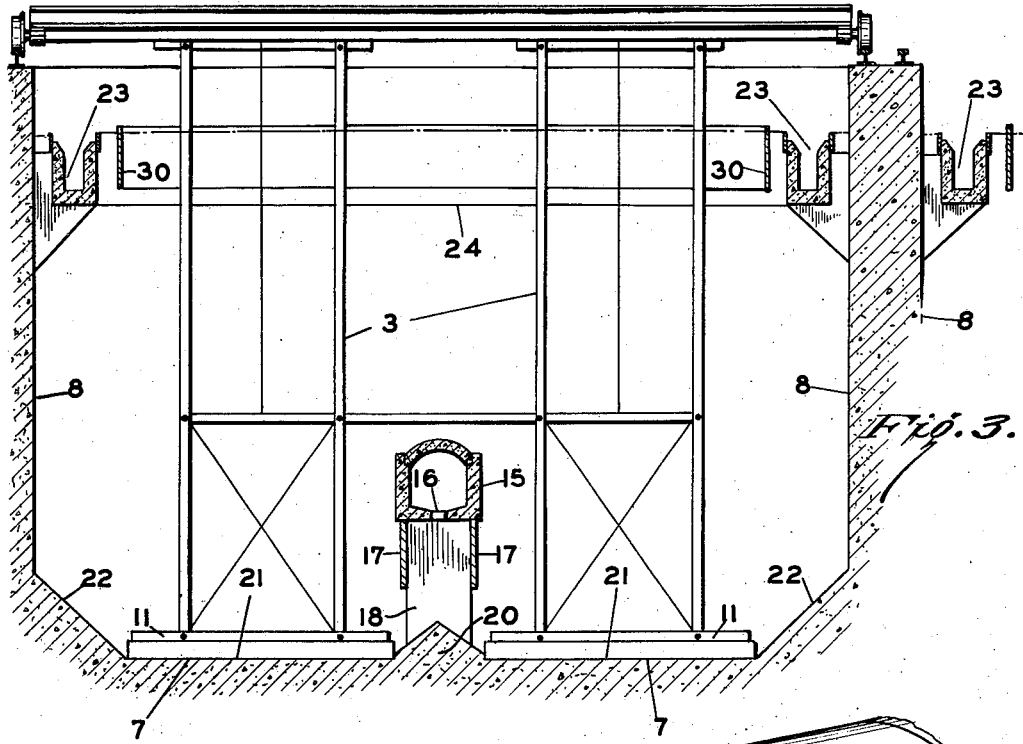
Fig. 3 is a vertical transverse sectional view of the clarifier of Fig. 1 and is a view taken on the plane indicated by the broken line 3—3 of Fig. 2 looking in the direction of the arrows.

Figs. 7 and 7a collectively illustrate a sectional view, partially broken away, of the influent supply conduit of Fig. 6, Figs. 7 and 7a collectively illustrate a horizontal sectional view taken as on the planes indicated by the broken line 7a—7a of Fig. 6 looking in the direction of the arrows.

Figs. 8 and 8a collectively illustrate a sectional view, partially broken away, of the influent supply conduit of Fig. 6.

Figs. 8 and 8a collectively illustrate a vertical sectional view taken as on the plane indicated by the broken line 8—8 of Fig. 6 looking in the direction of the arrows.

Fig. 9 is a perspective view illustrative of a further form of clarifier that employs a centrally located influent supply conduit with a longitudinally arranged series of submerged discharge passageways and a centrally located effluent trough or launder that is positioned directly over the influent supply conduit.

Fig. 10 is a vertical cross sectional view of the centrally located influent supply conduit and the centrally located effluent launder of Fig. 9.

Reference will now be made to the drawings in detail. The clarifier of Figs. 1 to 4 will first be described. The clarifier as a whole is collectively designated by 1 and it comprises a sedimentation chamber or settling tank 2—into which liquid carrying solids in suspension is introduced for the purpose of effecting a clarification of the liquids as the result of sedimentation—and a mechanically operated scraping or raking mechanism collectively designated as 3. The mechanical scraping or raking mechanism is arranged with respect to the tank so as to effect a scraping and impelling along the floor of the tank of settled or deposited solids, in the form of sludge, to a sump provided by a pocket or receiving section 4 from which the sludge is removed in a suitable manner.

This clarifier, which is typical of any one of a series of rectangular clarifiers that may be assembled in a liquid clarification system, receives the liquid to be clarified from a transversely extending main influent channel or conduit 5 located at one end of the clarifier. From the clarifier the effluent ultimately passes to and into a transversely extending main effluent channel or conduit 6. The rectangular settling tank 2 is relatively long as compared with either its breadth or depth and is generally left uncovered or in other words it is open at the top. It is made of concrete or any other suitable material and as shown is constructed so as to comprise or provide relatively flat horizontal bottom or floor portions 7 and so as to have longitudinally and vertically extending side walls 8 and transversely and vertically extending end walls 9A and 9B. In the arrangement as shown the sludge pocket or sump 4 is located at one end of the tank and interrupts the continuity of the flat floor portion. The pocket 4 extends a substantial distance below the supporting surface 10 of the floor. Sludge is raked or scraped from and along the floor as by scrapers or rakes 11 of the scraping or raking mechanism 3 and by the scrapers or rakes 11 the sludge is ultimately passed into the sludge receiving pocket 4 from which the sludge is removed in a suitable manner as through the medium of a pumping mechanism that includes the suction pipe 12.

Figure 4:
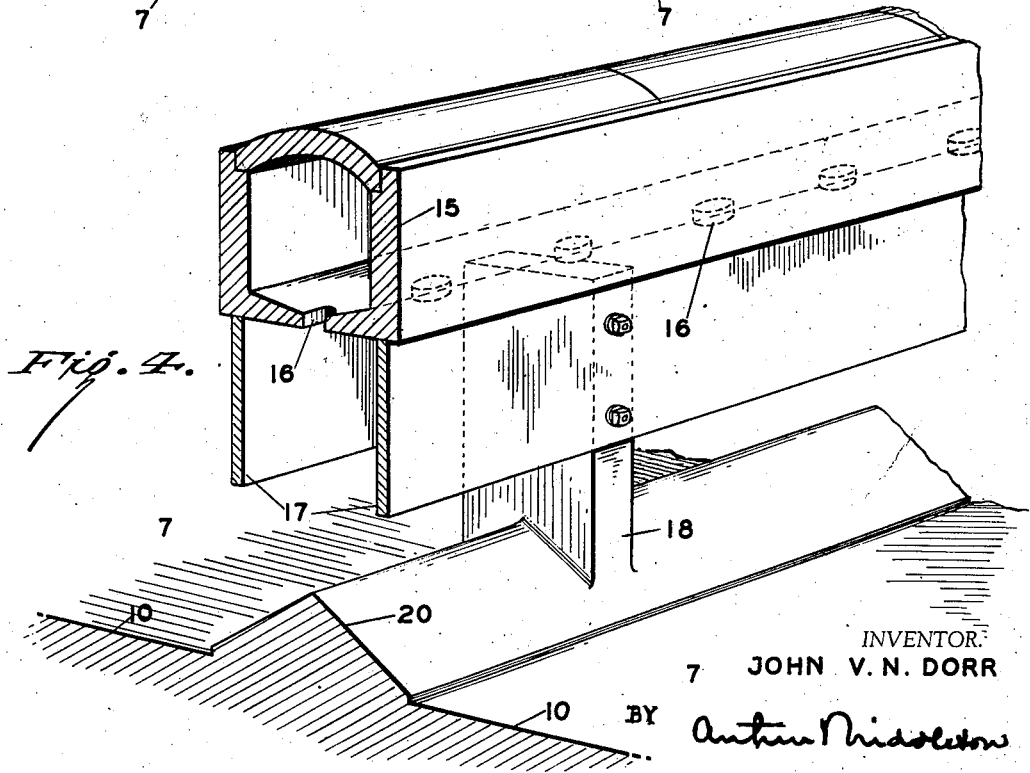
Fig. 4 is a perspective view showing—on a larger scale than in Fig. 3—the influent supply conduit, its relationship in respect to a centrally located longitudinally extending rib below it, and the mode of supporting the conduit in spaced relationship above the rib.

One of the end wall portions or end structures of the clarifier tank may be considered as providing at least a portion of the main influent channel 5 and through this portion there is provided an orifice or discharge opening 13 into and through which the influent for the particular tank passes on its way to the tank. The tank is also provided with branching influent receiving and supply sections or conduits 14 and 15. The influent receiving section 14 is, as shown, an elbow shaped pipe or conduit that provides a vertically extending portion into which the influent from the orifice or opening 13 is received and through which the influent passes first downwardly thence horizontally towards and into the section or conduit 15 herein termed and often referred to as the longitudinally extending influent supply trough or conduit. This influent supply conduit 15 extends horizontally for the full length or for nearly the full length of the interior of the settling tank and it is located in the lower portion of the longitudinally extending central section thereof. A cross section of this pipe or conduit 15 is shown in Figs. 3 and 4. In the form or construction as shown the influent enters the conduit 15 at one end thereof and the influent is discharged therefrom through a series of longitudinally arranged discharge passageways or openings 16 provided in and along the lower wall portion thereof. These discharge passageways or openings are preferably in the form of restricted openings as round holes or slots. They are submerged, and deliver the effluent in a general downward direction and distribute it relatively uniformly throughout the length of the tank, whereby in passing longitudinally of the tank each succeeding transverse section of the tank receives substantially the same amount of influent which is to be subject to the sedimentation process. The influent supply conduit 15 may be considered as made up of a series of longitudinally arranged sections having influent discharge openings or passageways illustrated in plan in Fig. 1 and also illustrated in Fig. 4. In regard to this aspect of the invention it is immaterial as to whether there is employed as an influent supply and distributing element a pipe—technically so called,—or a trough—frequently so called, if left open at the top,—particularly since an essential is that the discharge openings 16 through the bottom portion thereof shall be relatively restricted or small and that they shall be located relatively low within the tank whereby they are submerged and thus deliver the influent against a hydrostatic head. In the arrangement shown in Figs. 1 to 4 inclusive the influent supply conduit 15 as a whole is submerged. Means for more positively controlling the flow direction of the influent leaving the influent supply conduit 15, are shown to be provided as exemplified in the form skirts or depending aprons or plates 17 (see Figs. 2 and 4). A similar arrangement can be discerned in Figs. 6, 9 and 10.

The influent supply conduit 15 is suitably supported as at the extreme ends of the tank by the concrete structure of the tank, and there are also preferably provided intermediate supports 18 as is clearly shown in Figs. 2, 3 and 4.

It is possible that the influent supply conduit 15 may become plugged or obstructed due to the entrance of unduly large material or of material which may mass and to avoid any difficulties which may be experienced because of this, the influent delivery section may be constructed so that certain sections of the top portion thereof can be removed and replaced, as by providing top sections designated 19. These sections 19 are sometimes referred to as the removable roof sections of the influent supply conduit.

In the tank as shown there is also provided a longitudinally extending centrally located rib 20 that is located at the floor portion and which divides the floor into sludge receiving sections 21—21 along the sides thereof. This rib is made A-shaped and the vertex portion of the A is located directly below the influent discharge openings. The downwardly and outwardly (or downwardly and transversely) sloping walls of this rib can serve to both direct depositing sludge into the sludge receiving sections and also to deflect the downwardly flowing influent transversely or laterally in respect to the tank. The transverse or lateral flow of the influent ensures the maintaining of the rib relatively clear of deposited material and particularly free of any material likely to adhere thereto for any length of time.

The lower interior portion of the tank along the sides thereof has also been provided with sloping portions 22—22 which tend to cause the settling sludge to slide transversely, viz. downwardly and inwardly into the sludge receiving sections 21—21 previously referred to.

Effluent launders sometimes referred to as effluent receiving launders 23—23 are arranged along and within the upper portions of the tank. These effluent launders preferably in the main parallel the side walls of the tank, also they are preferably inwardly spaced a slight distance in respect to the side walls whereby as the result of this arrangement effluent can enter each such launder by overflowing thereinto at and along each side thereof. One end 23A of each of these launders—the end nearest the influent end of the tank—is blind or closed while the end 23B—the end nearest the effluent delivery end of the tank—merges into a transversely extending effluent collecting launder or section 24 which in turn through the short conduits or portions 25 delivers the effluent by a longitudinal flow into the transversely extending main effluent trough or conduit 6.

The tank is also provided at one end thereof, to wit, preferably at the influent receiving end thereof with a transversely extending scum launder 26 which is arranged within the upper portion of the tank so as to receive scum which is conveyed or passed thereto as through the instrumentality of a scum scraper 27 hereinafter referred to. This scum launder or trough 26 is arranged to conduct away the scum to any suitable place for disposal of the same. The scum launder is separated from the main influent conduit 5 through the medium of a wall portion 28 that extends above the water level of the liquid within the tank.

Reference has heretofore been made to the raking or scraping mechanism 3. This comprises any suitable means for supporting and actuating the same. As far as the essence of the present invention is concerned it is sufficient to point out that this mechanism includes raking or scraping elements 11 which are longitudinally movable in a lower position from the effluent end of the tank towards the influent end of the tank and which during said movement effects a raking or scraping and impelling of deposited sludge longitudinally along the floor 7 of the sludge receiving sections 21 to and into the sludge pocket or sump 4 heretofore referred to. There are two sets of these rakes or scrapers 11 as is clearly shown in Fig. 3 whereby the sludge receiving sections at opposite sides of the longitudinally extending centrally located rib 20 are simultaneously scraped.

During the return movement of the scrapers 11 they occupy an elevated position shown in dotted lines in Fig. 2 and in order that there shall be no dead pocket in the tank which is not reached by the scrapers 11, there is provided a fillet portion or a horizontally extending rib 29 that extends transversely the full width of the tank.

In Fig. 3 there clearly appear scum baffles designated as 30—30 which are inwardly located in respect to the effluent receiving launders 23, which are fairly close to these launders, which extend above said launders, and which parallel said launders the full length thereof. These scum baffles prevent any substantial accumulation of scum in the region of the effluent receiving launders and they serve to confine within the space between them any scum tending to accumulate in and at the main top portion of the tank. The mechanically operated raking or scraping mechanism 3 also preferably includes as an adjunct or auxiliary thereto the transversely extending scum scraping member 27. This member 27 in effect serves as a broom to scrape or move the scum confined between the scum baffles 30 in a general forward longitudinal direction, and to sweep the scum into the scum launders 26. The mechanism for operating this scraping mechanism 3 is driven in any suitable manner as from a motor 31 through the medium of the endless rope drive 32 shown in association therewith and the construction is also such that the scum scraping member 27 during a forward longitudinal scraping movement is in a lower scraping position whereas during a return movement it is in elevated inoperative position above the surface of liquid within the tank.

It will be understood however that for the purpose of the invention any other suitable form of sludge scraping mechanism and of scum scraping mechanism could be employed as a substitute for or in place of that herein indicated.

The effluent launders are carried through the medium of the intermediate supports 18 and it will be noted that the sloping floor portions of the rib 20 as described serve to clear the space between these intermediate supports 31—31 of any deposited sludge or solids tending to collect therein.

In the normal functioning of the clarifier herein shown and disclosed it will be noted that there is a submerged delivery of the influent into and along a lower interior portion of the settling tank, that this delivery is against a relatively substantial head whereby only slight pressure differential exists, that this influent delivery is through a series of relatively restricted passageways provided for substantially the entire length of the influent discharge section, that this influent delivery is relatively uniform throughout the various longitudinally arranged transverse sections of the tank, and that the effluent for each section is delivered into the settling chamber of the tank in a general downward direction.

It will also be noted that the liquid which is subject to sedimentation has a U-shaped transverse flow from a lower section of the tank to the effluent receiving launders and that the path of the flow is relatively long. It will also be noted as previously indicated that the effluent enters the effluent receiving launders along opposite sides thereof whereby a relatively slow but large effluent delivery can be taken care of without disturbing the sedimentation which is carried out within the tank. According to the preferred form or arrangement as illustrated in and by Figs. 1 to 5 inclusive the influent delivery section or conduit 15 is located in the lower central portion of the tank and the effluent receiving launders 23—23 are located at the upper side portions of the tank whereby the incoming liquid which first enters the lower portion of the tank in a general downward path and is compelled to separate or divide into transverse flow paths or lines, some going to the right towards the effluent receiving launder at the right hand side of the tank and some going to the effluent receiving launder at the left hand side of the tank.

Much has heretofore been made of the fact that the discharge openings 16 leading from the influent supply conduit 15 are relatively restricted or small. It is feasible to construct this influent supply conduit so that the discharge openings thereof are of the required fixed or predetermined size. In certain instances however it may be desirable to employ discharge construction for the influent supply conduit which will permit adjustment or variation in size of the discharge openings or discharge sections thereof.

Fig. 6, Figs. 7 and 7a and Figs. 8 and 8a show a construction according to which any size of discharge passageway within a reasonable limited range can be attained. In Fig. 6 there is illustrated in cross section a longitudinally extending influent supply conduit 115 which can be employed in place of and as a substitute for the influent supply conduit 15 of Figs. 1 to 4 inclusive. The conduit of Fig. 6 has depending aprons or plates 117 for ensuring a continued downward flow space below the influent supply conduit. The base portion of the conduit 115 has a series of discharge passageways or openings 116. Operatively associated with this base portion of the conduit 115 there is provided a longitudinally arranged series of adjustable members or apertures 118A, 118B, 118C, and 118D respectively provided with openings 119A, 119B, 119C and 119D which can be positioned to register with the discharge openings or passageways 116. However a gear mechanism is provided for each plate or member 118A whereby any desired effective area for a passageway or opening can be realized as for example a restricted square area defined by the lines AB, BC, CD, and DA of Fig. 7. Each of these plates or members 118A, 118B, etc., as the case may be, comprises a toothed rake 120 with which there meshes the teeth of a spur gear as 121 that is carried on a suitably mounted shaft 122 which in turn is actuated through the medium of suitable gearing including members such as beveled gears 123 and 124, shaft 125, beveled gears 126 and 127 and any suitable operating mechanism therefor. There is a set of this operating gearing for each particular plate or member 118A with the result that the discharge passageways for any particular section can be regulated independent of the discharge passageways for the other sections of the influent discharge conduit.

Figs. 9 and 10 illustrate an arrangement that contains or embodies the essential features of the arrangement of Figs. 1 to 5 inclusive but it will be noted that in respect to the arrangement of Figs. 9 and 10 the influent supply conduit 215 which corresponds in functional arrangement and position to the influent supply conduit 15 of Figs. 1 to 4 has located above the same an effluent receiving conduit 226. In short in the arrangement of Fig. 9 there is at and located along the upper portion of each side of the sedimentation tank an effluent receiving launder 223 and at and along the upper central portion of the sedimentation tank a longitudinally extending effluent receiving launder 226. These effluent receiving launders deliver into a transversely extending effluent collecting launder 224 which in turn delivers into a short longitudinally extending conduit or passageway 225 leading to a main effluent delivery launder. Depending aprons 217 are arranged along the influent supply conduit 215 and these aprons function in the same manner as the aprons 17 described in connection with the arrangement of the Figs. 1 to 4.

In the arrangement of Figs. 9 and 10 there is provided a longitudinally arranged series of relatively restricted discharge passageways or openings 216 and associated with each discharge section of the influent supply conduit 215 there is provided a member 218 which is vertically adjustable through hand operated mechanism 219 for varying or regulating the effective discharge opening or passageway for the corresponding discharge opening 216.

A clarifier embodying the features of construction herein described can be made of any length within reasonable limits and having regard to the proper design and general functioning thereof one is enabled to realize a relatively uniform flow for each section thereof regardless as to whether the clarifier is long or short. The present invention leads to a construction which readily adapts itself to any desired location, to any desired size or length of clarifier, and to any desired total plant capacity by merely multiplying the units thereof. In other words the employment of a clarifier such as herein outlined readily adapts itself to a plant construction of suitable size for the present day needs but it also permits an extension of the plant in many ways or directions without detrimentally affecting the operation of that portion or portions of the plant already installed.

What is claimed is:

1. A decantation and solids settling clarifier equipped for mechanically removing settled solids while the effluent overflow separation functions, which comprises in combination a longitudinally-extending rectangular horizontal tank that is substantially longer than wide or high and has upstanding boundary walls and a substantially horizontally-extending flat bottom for suspended solids to settle thereon, and has a solids discharge in the bottom, effluent outflow means including a substantially lineal and level overflow weir edge extending along the upper longitudinal portion of the tank and substantially parallel to the longitudinal axis thereof and designed to cause a substantially evenly distributed overflow to take place therealong; influent conveying and distributing means also extending parallel to said longitudinal tank axis and substantially the length of said overflow weir edge, which means have a submerged influent delivery portion extending within the boundaries of the tank and spaced from the bottom thereof, said submerged influent portion having in turn disposed along the length thereof a series of relatively closely-spaced and relatively restricted influent delivery openings adapted to deliver therethrough substantially evenly distributed influent component portions as from a longitudinal base corresponding to the length of the tank and of said influent-conveying means and into the liquid body in the tank, said submerged influent delivery portion otherwise co-operatively associated with and co-ordinated to said effluent weir in a manner to effect a general flow of said influent or influent component portions from said longitudinal base substantially upwardly and transversely of the tank to and over a substantially corresponding length of said overflow weir; and raking mechanism disposed in and relative to the tank interior for conveying settled solids over the tank bottom to said discharge, and including rake-supporting portions designed to extend exteriorly and clear of said submerged influent portion.

2. A sedimentation apparatus according to claim 1, in which the influent conveying and distributing means comprise an influent supply conduit disposed intermediate the side boundary walls of the tank and spaced therefrom; in which the influent delivery openings are disposed in the submerged influent delivery portion so as to effect the delivery therethrough of influent liquid in a downward direction; in which the effluent overflow weir edges and associated effluent-conducting means therefor are disposed to extend in substantially symmetrical relation to said influent conduit and substantially at and along the upper portion of the side walls of the tank; and in which the raking mechanism comprises a pair of raking elements disposed in substantially symmetrical fashion straddling and clear of said conduit, and also a reciprocable carriage operatively supporting said raking elements.

3. A sedimentation apparatus according to claim 1, in which the influent conveying and distributing means comprise an influent supply conduit intermediate the side boundary walls of the tank and spaced therefrom; in which the influent delivery openings are disposed in the submerged bottom portion of said influent delivery so as to effect the delivery therethrough of influent liquid in a downward direction; in which the effluent overflow weir edges and associated effluent conducting means therefor are disposed to extend in substantially symmetrical relation to said influent conduit and substantially at and along the upper portion of the side walls of the tank; a longitudinally-extending shallow ridge located directly below said influent delivery openings of the supply conduit and in effect dividing the tank bottom into sectional solids-settling areas to extend at each respective side of said conduit; and in which the raking mechanism comprises raking structure disposed to extend symmetrically to and exteriorly and clear of said conduit, and operable relative to said sectional solids-settling areas to convey settled solids along the length of the tank to said discharge.

4. A sedimentation apparatus according to claim 1, with the addition of means for regulating the effective flow area of the influent delivery openings with respect to the flow area of the influent conveying means.

5. A decantation and solids settling clarifier, comprising a longitudinally-extending substantially flat-bottomed tank substantially longer than wide or high, effluent overflow receiving launder means longitudinally co-extending therewith, an influent conduit supported upon and along the tank bottom, and disposed intermediate the tank side walls and in co-operative parallel relationship with said overflow launder means and having submerged relatively restricted influent delivery outlet means along and in the lower portion of said conduit to be adapted for downward and substantially uniformly distributed influent delivery at a point in the lower portion of the tank interior, a pair of baffles flanking the influent delivery means and extending along and from the conduit downwardly to a point spaced from the tank bottom to permit passage of feed through the clearance between the baffles and the tank bottom in co-operative relationship with said influent delivery means and said baffles, a flow dividing ridge provided upon the tank bottom opposite said conduit delivery portion, and sludge-raking means operatively engageable upon the tank bottom.

6. In combination, a longitudinally-extending clarifier tank, a longitudinally extending influent supply conducting means having downwardly-discharging normally-submerged relatively restricted influent delivery means, means for regulating the effective flow area of the influent delivery means relative to the effective flow area of the influent supply-conducting means, and supports for sustaining the conduit upon and along and spaced from the tank bottom.

7. In combination, a longitudinally-extending clarifier tank, a longitudinally-extending influent supply-conducting means having a lower portion adapted for downward influent delivery therefrom, provided with a series of downwardly-discharging and normally-submerged relatively restricted individual passageways, and means for individually regulating the effective flow area of the respective passageways relative to the effective flow area of said supply-conducting means, and supports for sustaining the conducting means upon and along and spaced from the tank bottom.

8. In combination with a longitudinally-extending clarifier tank, a longitudinally-extending influent supply-conducting means having a lower portion provided with a series of downwardly-discharging and normally-submerged relatively restricted individual passageways adapted for downward and substantially uniformly-distributed influent delivery at a point in the lower portion of the tank interior, a pair of baffles flanking said series of passageways and extending along and from the lower conduit portion downwardly to a point spaced from the tank bottom to permit passage of feed through the clearance between the baffles and the tank bottom, a flow-dividing ridge provided upon the tank bottom opposite said influent-discharging passageways and in co-operative relationship with said influent delivery means and said baffles, and supports for sustaining the conducting means upon and along and spaced from the tank bottom.

JOHN van NOSTRAND DORR.